Jan. 19, 1932.   A. NOBLE   1,841,908
DUPLEX THERMOMETER UNIT
Filed March 13, 1929
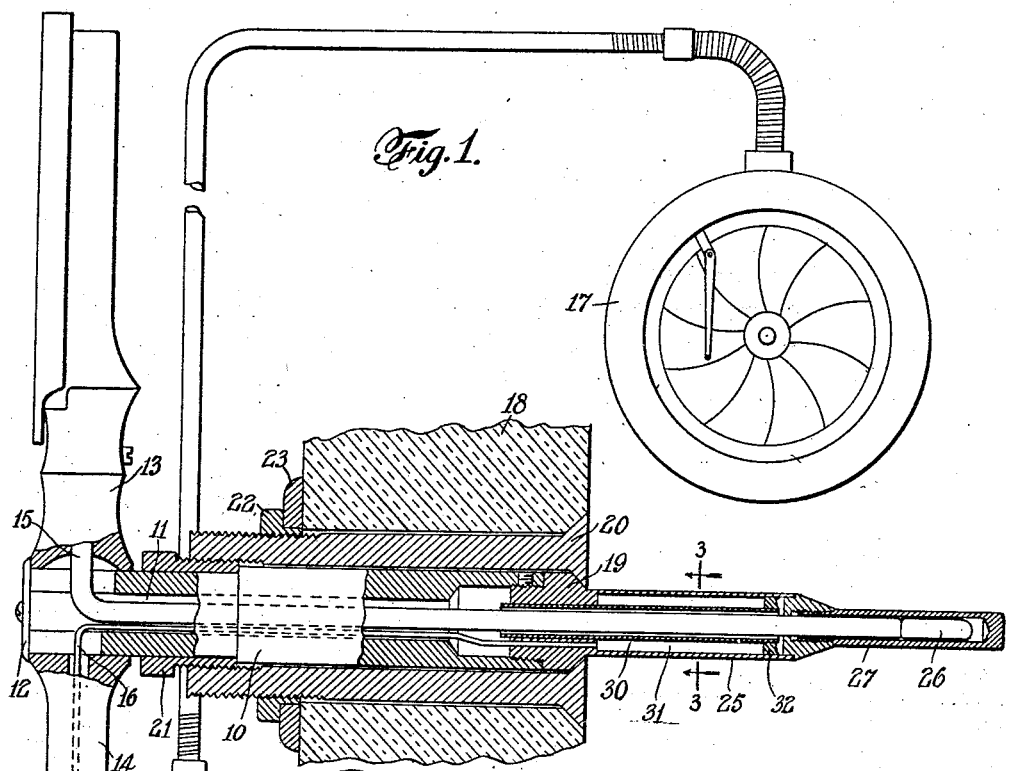
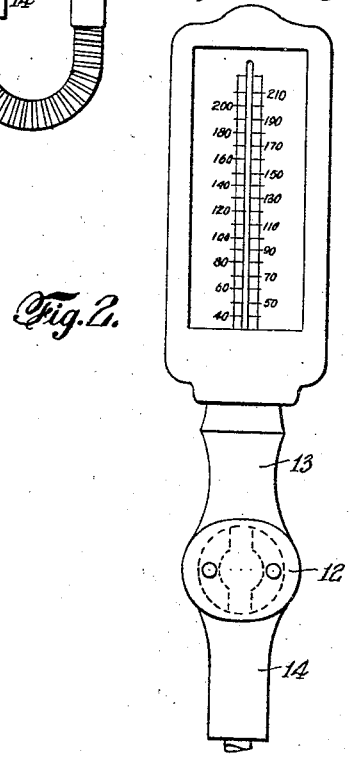
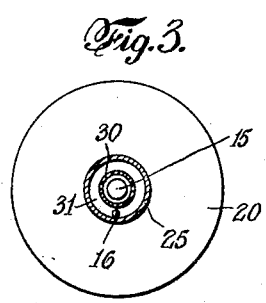
INVENTOR
ALPHONSO NOBLE
BY
ATTORNEY Patented Jan. 19, 1932

1,841,908

UNITED STATES PATENT OFFICE

ALPHONSO NOBLE, OF NAUGATUCK, CONNECTICUT, ASSIGNOR TO THE BRISTOL COMPANY, OF WATERBURY, CONNECTICUT, A CORPORATION OF CONNECTICUT

DUPLEX THERMOMETER UNIT

Application filed March 13, 1929. Serial No. 346,565.

The invention relates to thermometric measuring apparatus, more particularly such as is suitable for affording simultaneously an indication or record locally and at a point remote from where the measurement is actually performed. Certain applications of apparatus of this character require, also, that a smooth exterior be presented by the portion subjected to the medium whose temperature is to be measured, for example, in complying with the sanitary regulations essential to the pasteurization of milk. Furthermore, in the use of certain tanks commonly employed in the pasteurizing process, it is frequently the practice to require an individual measuring thermometer in association with the bulb of a recording thermometer, and to require, moreover, that the bulbs of both pass through a single opening in the wall of the tank. An additional requirement necessitates a perfectly smooth exterior surface of the parts exposed to the medium whose temperature is to be measured such that there may not be irregularities to cause the medium to pocket or otherwise adhere or cake thereon. This portion of the apparatus should, moreover, be so constructed that it may readily be cleaned.

The invention has for its object to provide a temperature measuring device of this character to meet the aforesaid requirements; and, in carrying out the invention, the two temperature responsive elements, which may or may not be of similar types, are arranged to be supported by a common mounting, so that they may as a unit be inserted through a single opening in the wall of a container and both be exposed to the temperature which it is desired to measure.

The particular embodiment of my invention herein described takes the form in which there are exposed to the temperature to be measured two sensitive elements, one being a thermometer of the more or less conventional type, having mercury in a suitable glass bulb, and the other a temperature-responsive element in which a gas or a liquid or a combination of the two is contained in a hollow cylindrical bulb, the two bulbs being arranged in a substantially coaxial relationship, with the temperature-responsive portions in close proximity to each other, and both enclosed within a suitable protective casing. For purposes of distinction from the conventional mercury thermometer, the other temperature-responsive element is hereinafter referred to as of the "fluid-filled" type.

The casing as a whole is sealed at the end remote from the sensitive parts (the outer end), and is provided thereat with a pair of outlets, one for the mercury thermometer, and the other for a capillary tube communicating between the fluid-filled bulb and a suitable pressure-responsive instrument. The principle of the so-called "fluid-filled" thermometer is well known to those versed in the art, and forms no essential part of the invention. In general, and in accordance with well-understood laws of physics, there is developed in the bulb a pressure the magnitude of which depends upon the nature and the temperature of the fluid. This bulb, being placed in communication with a suitable pressure-responsive mechanism through the medium of a capillary tube, there is produced in the latter mechanism a deflection representative of the pressure, and therefore, of the temperature of the fluid within the bulb.

The deflecting element of the pressure-responsive part may take the form of an indicating pointer, a recording pen or stylus, or may be associated with controlling devices in such a manner as to operate signals indicative of temperature conditions or to actuate controlling means, with a view to regulating the measured temperature to a predetermined value.

The nature of the invention, however, will best be understood when described in connection with the accompanying drawings, in which:

Fig. 1 is a longitudinal section through the novel temperature measuring device.

Fig. 2 is an end elevation thereof.

Fig. 3 is a transverse vertical section taken on the line 3—3, Fig. 1 of the drawings, and looking in the direction of the arrows.

Referring to the drawings, the novel thermometer device is constructed of a casing member as the cylinder 10 axially bored through as at 11, the outer end being closed by a suitable cap member or plug 12, while arms 13 and 14 extend respectively in different directions from the outer end of said casing. One of these arms receives and protects the stem 15 of a mercury thermometer while the opposite arm serves similarly for a capillary tube 16 of a fluid-filled thermometer, placing the bulb thereof in communication with a suitable pressure-responsive element as the gauge 17 which may be located at a point remote from the said casing.

These two combined measuring elements are adapted for insertion as a single unit into a suitable tank or other container for liquid and the like, whose temperature it is desired to measure both locally and at a remote point, the mercury thermometer serving usually for the former purpose and the fluid-filled bulb with its associated pressure system for the latter.

As stated above, the pressure gauge, being calibrated in terms of temperature of the fluid-filled bulb, may be developed in the form of an indicating, recording or controlling instrument. As shown in the drawings, it takes the form of a continuous recording thermometer 17, providing a circular chart record, and constructed and operated in accordance with principles well known to those versed in the art of thermometry.

Various expedients for securing the casing 10 to a tank cover or wall of a container may be associated with the said casing 10. For example, when used in connection with the measurement and regulation of the temperature in the pasteurizing of milk, the casing 10 is inserted through a single opening in the wall 18 of the containing tank and, for this purpose, may be provided at its inner end with a conical screw plug 19 adapted to seat upon, and make a tight joint with, a suitably shaped surface within the inner end of a bushing 20, which passes through the wall of the tank. The plug 19 is held in engagement with its seat by the jam-nut 21, fitted over a reduced portion of the casing 10, bearing upon a shoulder on the main body thereof, and in threaded engagement with the inner wall of the bushing 20. The bushing 20 is retained in place by lock-nut 22, engaging a threaded portion of the outer surface of the bushing, and bearing against washer 23, thus serving to clamp the bushing tightly into the opening in the wall of the tank.

As shown, the stem 15 of the thermometer extends upwardly from the casing 10, and is also turned to pass axially through the bore 11 of said casing and through a tubular extension or element 25 (which is substantially in alignment with the bore 11) with its bulb 26 projecting beyond the outer end thereof and shown encased in a protecting shield 27. Both the protecting casing 25 and shield 27 should be of substantially smooth exterior so as not to favor the accumulation of any deposit thereon.

The plug 19 is thus carried inwardly to the tank in the form of the tubular extension 25, and contains a smaller tubular member or sleeve 30, coaxially mounted therein, and sealed at its outer end to the plug 19, as by brazing or soldering thereto, thereby forming an annular space 31 between the two tubular portions 25 and 30. At its outer end this space is closed by a suitable plug 32, brazed or soldered to the walls of the tubular members, thus providing a sealed chamber adapted to retain an expansible fluid and placed in communication with other elements of the device by means hereinafter described.

The capillary tube 16, also, passes into the bore 11, and therethrough, communicating with sealed chamber 31, thus forming a connection between this space and the pressure-responsive instrument 17, which, as explained above, may serve one or more of a variety of purposes to which such devices are adapted.

It will thus be seen that both the thermometer elements have their actuating elements exposed directly to the material whose temperature is to be measured and substantially at the same point and, moreover, are so associated that a remote as well as a local indication is possible. Furthermore, suitable protection is afforded the actuating elements; and the device, withal, is rugged, compact and of a character such that the accumulation of objectionable matter on the exterior thereof is not likely to occur. It also may be inserted as a unit through a single opening provided in a tank or like container and suitably secured thereto.

I claim:

1. Thermometer apparatus, comprising an annular temperature-responsive member, a second temperature-responsive member projecting through the first-named member, a support upon which both are mounted and whereby they are adapted for insertion as a unit through a single opening in the wall of a containing vessel, and for simultaneous exposure to the temperature of the material contained in said vessel.

2. Thermometer apparatus, comprising an elongated casing axially bored through, a pair of temperature-responsive elements fitted therein and each having active outer ends, the elements fitting the one within the other, and both active ends projecting beyond the inner end of the casing and one active end projecting beyond the other active end whereby both may simultaneously be exposed to the same temperature, and means extending the active ends of both elements beyond the casing.

3. Thermometer apparatus, comprising two independent and coaxial temperature-responsive elements, the one passing coaxially through the other, a support upon which both are mounted and whereby they are adapted for insertion as a unit through a single opening in the wall or cover of a containing vessel, to be secured thereto and adapted for simultaneous exposure to the temperature of the material contained therein.

4. Thermometer apparatus, comprising an elongated casing axially bored through, a thermometer stem passing through the bore of said casing with bulb projecting beyond the far end of the same, a tubular extension, through which said stem passes, secured to the far end of said casing in a substantially coaxial relationship, a sleeve mounted about the thermometer stem portion within the tubular extension and connected at one end to said casing to be sealed thereat, and a washer sealing the sleeve to said tubular extension at the opposite end to provide thereby a closed annular chamber about the said portion of the thermometer stem within the tubular extension, and a capillary tube opening into said chamber and extending through the bore of said casing.

5. Thermometer apparatus, comprising an elongated casing axially bored through, a thermometer stem passing through the bore of said casing with bulb projecting beyond the far end of the same, a tubular extension through which said stem passes, secured to the far end of said casing in a substantially coaxial relationship, a sleeve mounted about the thermometer stem portion within the tubular extension and connected at one end to said casing to be sealed thereat, the bulb of said thermometer extending beyond the tubular extension, a protective shield about said bulb and secured to the tubular extension, a washer sealing the sleeve to said tubular extension at the opposite end to provide thereby a closed annular chamber about the said portion of the thermometer stem within the tubular extension, and a capillary tube opening into said chamber and extending through the bore of said casing.

In testimony whereof I affix my signature.

ALPHONSO NOBLE.